Figure 1:
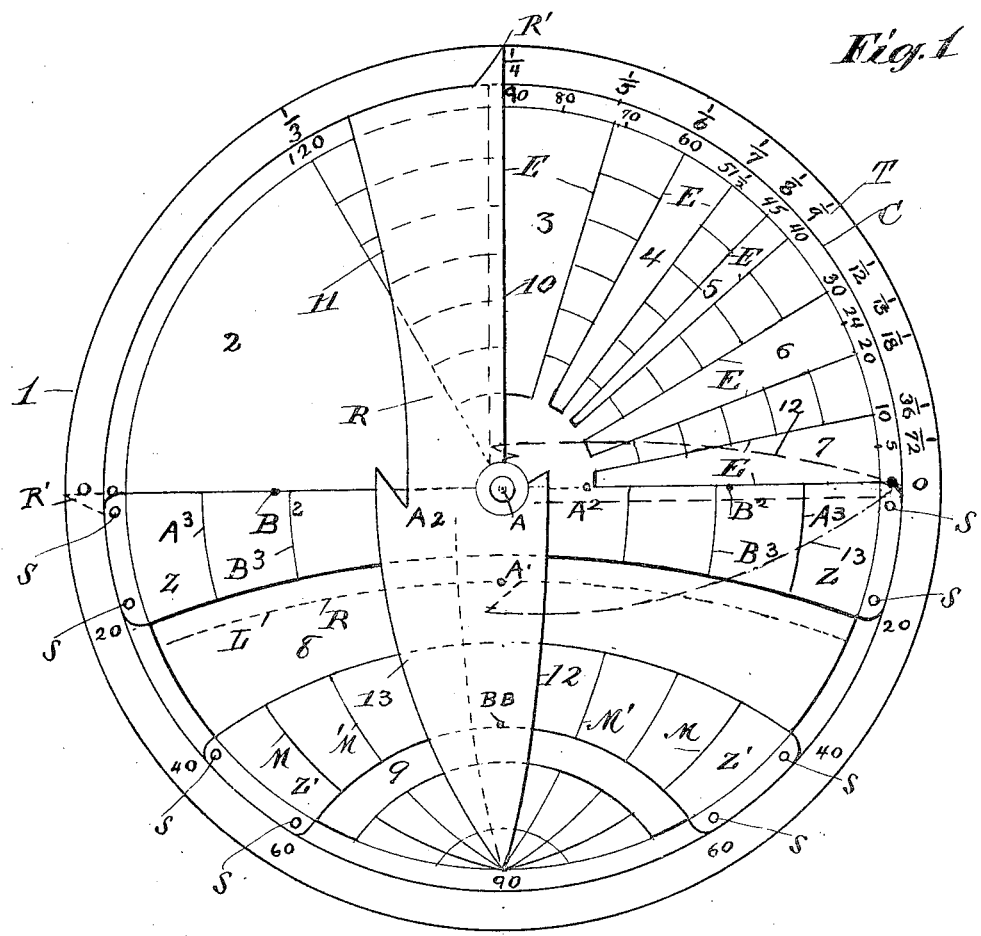

E. C. JACOBS.
SCHOOL APPLIANCE.
APPLICATION FILED JULY 20, 1912.

1,132,272.

Patented Mar. 16, 1915.

Witnesses
P. Bredel
H. H. Anderson

Inventor
Edwin C. Jacobs
by Wm. H. Monroe
Attorney

UNITED STATES PATENT OFFICE.

EDWIN C. JACOBS, OF NORWALK, OHIO.

SCHOOL APPLIANCE.

1,132,272.  Specification of Letters Patent.  Patented Mar. 16, 1915.

Application filed July 20, 1912. Serial No. 710,627.

*To all whom it may concern:*

Be it known that I, EDWIN C. JACOBS, a citizen of the United States, and a resident of Norwalk, in the county of Huron and State of Ohio, have invented certain new and useful Improvements in School Appliances, of which I hereby declare the following to be a full, clear, and exact description, such as will enable others skilled in the art to which it appertains to make and use the same.

The objects of the invention are to provide a combined protractor and chart for educational and other uses, mainly designed to facilitate the instruction of children in the use of fractions by the division and subdivision of great arcs into fractional parts, thus providing an easy method of teaching fractions, and it also has reference to a simple and easy method of drawing divisions of the earth's surface, such as parallels of latitude and great arcs or meridians and thus make easy the drawing of parts which are usually a difficult matter for young children to draw. To accomplish these objects triangles representing divisions of the earth's surface are cut from a disk representing a segment of the globe, and also a ruler B pivoted at the center of said disk is provided with straight and curved edges corresponding to outlines of both tropics, the equator, and some of the meridians, and is also provided with centers from which the remaining meridians can readily be struck, using the center of the disk mostly as a pivot point, but for the outside meridians different centers are marked on the equator of the disk to form true meridians.

Other features of utility of the device appear also in the following description and are illustrated in the accompanying drawings, and specifically pointed out in the claims.

Figure 2:
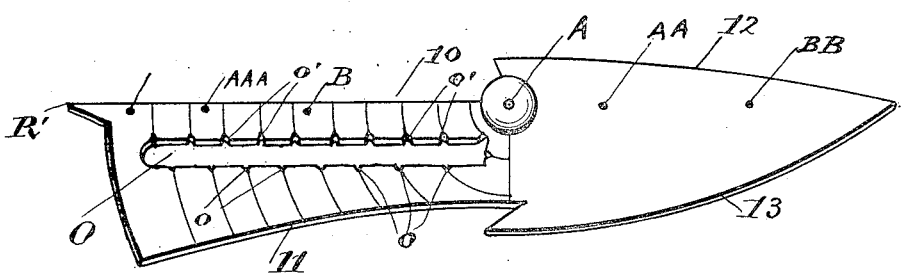

In the accompanying drawings Figure 1 is a plan view of the complete device; Fig. 2 is a detail view of the ruler by means of which the lines, which are the most difficult of execution can be drawn upon the map; Figs. 3 and 4 illustrate separately formed sectors.

In Fig. 1, 1 is a disk which may be of card board celluloid, or other thin rigid material. The upper portion upon which a great circle $c$ is drawn is graduated in degrees and fractions thereof and triangles 2, 3, 4, 5, 6, and 7 or a greater or less number of them as desired are cut out of the disk, and the balance of the fractional units are marked by notches from which to draw extra radii. These sectors represent respectively $\frac{1}{2}$, $\frac{1}{4}$, $\frac{1}{5}$ and other fractional parts of the whole disk and by using the radial edges E, E, of the sectors as rulers, the sectors can be easily copied by children upon paper placed below the disk, also stars having any desired numbers of points can be made or other figures having definite angles. Of these a large variety can be made using the center A of the disk as a center for each figure.

The graduations on the edge of the disk can be made as fine as desired. At 8 and 9 spaces are cut out of the disk their edges representing respectively the parallels of latitude for 20° 40° 60° 80° and 67½° and at the pole if desired up to 90°. These parallels can then easily be drawn by using the edges of the openings as guides for the pencil. The equator is also drawn upon the chart. To draw the lines representing the Tropics of Cancer and Capricorn and the meridians a special pivoted ruler is provided having one straight edge 10 and curved edges 11, 12 and 13. The curved edge 11 is used to draw the lines of the tropics and to accomplish this the ruler is placed in the horizontal position and a pin or needle is thrust through the opening A' in the ruler and A in the chart and the edge 11 will then coincide with the dotted line L in the Fig. 1 and one half of the tropic line can be drawn. The ruler is then turned over and the other half is drawn. This position of the ruler is shown in Fig. 1 in dotted lines. To draw the meridians the ruler R is placed in the vertical position with a pointed extremity R' at the North Pole and two meridians can be drawn by means of the curved edges 12 and 13, and by turning over the ruler two or more can be drawn. The southern half of the same meridian can be drawn by placing the pointed extremity at the South Pole. By using the opening A, A, in the ruler as a center and placing the pivot pin in the opening A² in the chart and the pencil at A, A, A in the ruler the meridians, M, M can be drawn and by placing the pivot pin in the openings B, B in the ruler and A³ in the chart and the pencil at B in the ruler the meridians M' M' can be drawn.

The parts of the chart can be used as an integral disk and inseparable, or the triangular portion T and the zones Z, Z, can be separate and joined to the rest of the disk by any means such as the staples S, S.

In Fig. 2 the ruler R is shown provided with a slot O, the sides of which are provided with means for locating the position of the pencil in drawing circles, comprising preferably notches o, o, positioned at predetermined distances apart in which the point of a pencil can be placed when it is desired to draw circles or arcs of different diameters. The pivotal ruler R can also be used in drawing radii by tracing along its straight edge 10.

Having described the invention what I claim as new and desire to secure by Letters Patent is:

1. In a drawing instrument for school use, a chart having a great circle thereon, and having its edge graduated in degrees and fractions thereof, and provided with openings having radial edges and also with openings the edges of which represent parallels of latitude.

2. In a drawing instrument, a disk shaped chart, having a great circle inscribed thereon, and having its edge graduated in divisions of a great circle, and a ruler pivoted in the center of the said great circle, the said ruler having a straight radial edge, and a curved edge corresponding to the lines of the tropics, and meridianal lines respectively.

3. In an instrument for school use, a chart having an arc of a great circle inscribed thereon and provided with openings, representing fractional parts of the circle, and a base line inscribed thereon.

4. In a disk shaped chart, segmental portions secured to each other, one portion provided with openings representing fractional parts of the chart and another with openings the edges of which represent parallels of latitude.

5. A ruler designed to be applied to a chart representing the world's surface, said ruler comprising a body having a straight edge and curved edges by means of which the tropics and meridian lines can be drawn and having perforations for the different centers about which the ruler can be rotated for drawing other meridian lines.

In testimony whereof, I hereunto set my hand this 10 day of July, 1912.

EDWIN C. JACOBS.

In presence of—
WM. M. MONROE,
G. A. HOWELLS.